United States Patent [19]
Tackett

[11] 4,104,852
[45] Aug. 8, 1978

[54] LAWN CLIPPING VACUUM COLLECTOR

[76] Inventor: DeForest Tackett, P.O. Box EG-891, Melbourne, Fla. 32935

[21] Appl. No.: 739,733

[22] Filed: Nov. 8, 1976

[51] Int. Cl.² .......................................... A01D 35/22
[52] U.S. Cl. ...................................... 56/202; 56/16.6
[58] Field of Search ...................... 56/202, 13.3, 16.6

[56] References Cited

U.S. PATENT DOCUMENTS

| 3,367,092 | 2/1968 | Gifford | 56/16.6 |
| 3,657,865 | 4/1972 | Ober | 56/13.3 |
| 4,047,368 | 9/1977 | Peterson | 56/202 |

*Primary Examiner*—Russell R. Kinsey
*Attorney, Agent, or Firm*—Harold Gell

[57] ABSTRACT

An apparatus for collecting lawn clippings produced by a tractor type lawn mower is presented herein where a vacuum producing blower and collection bin form an assembly that is rigidly mounted to the rear portion of a tractor and coupled to the housing for the lawn mowing blades by a flexible duct. Power is produced by a belt drive adapted to couple the blower to the grass cutter drive shaft.

12 Claims, 6 Drawing Figures

U.S. Patent  Aug. 8, 1978  Sheet 4 of 4  4,104,852
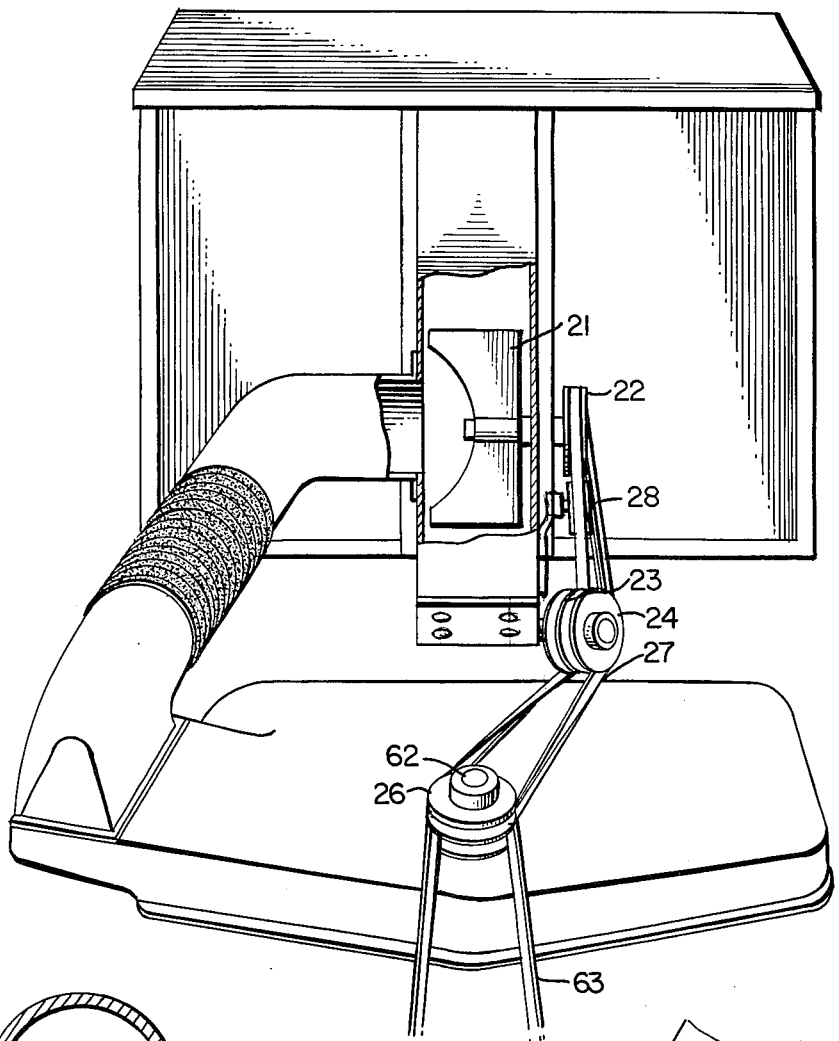
Fig 4.
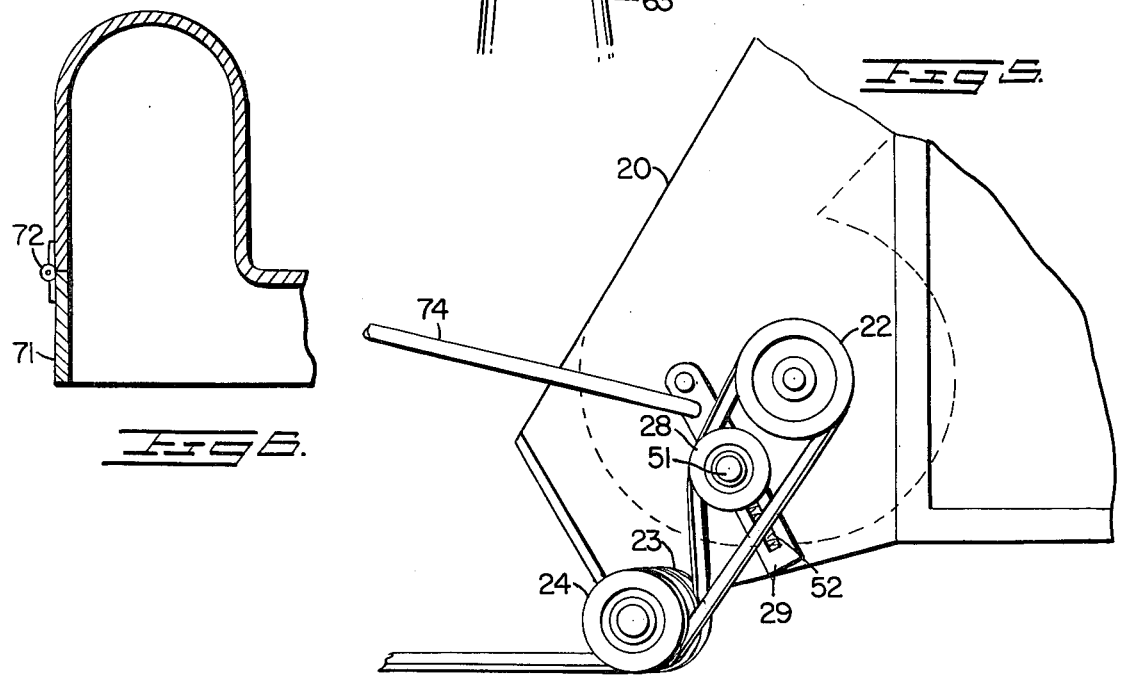
Fig 6.
Fig 5.

LAWN CLIPPING VACUUM COLLECTOR

THE INVENTION

This invention relates to grass catchers using a vacuum assist conveyor duct to transport clippings from the vicinity of the mowing blades to a refuse container.

BACKGROUND OF THE INVENTION

It is an established reality that grass clippings must be removed from lawns to prevent a heavy thatch of clippings from building up which will smother new grass growth, provide a hiding place for destructive insects and provide an environment suitable for the rapid growth of mold, fungus and other lawn diseases. The removal of grass clippings has been accomplished by a variety of techniques ranging from a manual rake to an elaborate vacuum cleaning system. The manual rake functions satisfactorily for a relatively small area but when large grass tracts are groomed that method is not practical. For large tracts, tractor powered mowers are normally utilized and grass clippings are removed by relatively sophisticated vacuum or vacuum and sweeper devices.

An example of a prior art means for removing grass clippings produced by a tractor type lawn mower is presented in U.S. Pat. No. 3,903,565 on "Leaf And Grass Cart Bagger" issued to Littleberry T. Hicks on Sept. 9, 1975. This patent discloses a refuse container mounted in a small trailer adapted to be pulled by the grass mowing tractor. Clippings are transported from the cutting area to the refuse container via a ducted vacuum transport which utilizes a blower powered by some unknown means. Presumably the blower is driven by an auxiliary internal combustion engine in a manner similar to that illustrated on Page 10 of the 1976 Yard And Garden Tractors And Attachments catalog prepared by Sears, Roebuck and Company.

The use of an auxiliary internal combustion engine to drive a blower is undesirable for it tends to increase the complexity and cost of the grass clipping collection system. Furthermore it is an inefficient waste of petroleum products which is to be avoided in view of the constant threat of fossil fuel supply exhaustion.

Trailor systems such as the Hicks system discussed above are not satisfactory when mowing around flower beds and similar areas for as the tractor rounds a corner, the trailer will turn in an arc which will cause the wheels to destroy the corner portions of the flower bed or other structure which is being circumnavigated. In some instances, such as going around the corners of buildings, the tractor has to swing wide to prevent the trailing grass catcher from striking the corner of the building and thus the grass close to the building cannot be mowed.

S. E. Clarke in U.S. Pat. No. 3,203,022 on "Vacuum Cleaner For Lawns" issued Aug. 31, 1965 suggests a way to eliminate the need for an auxiliary internal combustion engine for powering the blower in a vacuum lawn sweeper. Unfortunately this system can be used only with vehicles having a rear wheel differential gear train that incorporates a power takeoff shaft. This adds significantly to the cost of the vehicle and renders the vacuum cleaner attachment a very special purpose device fabricated for a specific type of tractor and not one which is normally found in the yard and garden market. Note that the Clarke device also incorporates a separate vacuum nozzle that adds significantly to the complexity and cost of producing the device and that it further requires a wheeled dolly to support the refuse container. The shortcomings of the wheeled dolly are similar to those discussed for the wheeled cart above.

OBJECTIVES OF THE INVENTION

In view of the obvious inability of the prior art systems to meet a growing need for a relatively simple, inexpensive and economically operable grass clipping collection system for use with tractor type lawn mowers, it is a primary objective of the present invention to provide a grass clipping collection system adapted to be driven by the same power source and drive train utilized by the mowing blades.

A further objective of the present invention is to provide a grass clipping collector for a tractor type lawn mower which is adapted to be suspended from the rear of the vehicle to preclude the possibility of trailer wheels destroying flower beds and similar areas which must be circumvented during lawn mowing operations.

A still further objective of the present invention is to provide a grass clipping collector incorporating a vacuum ducted refuse conveying system adapted to transport clippings from a mower housing to a refuse container.

Another objective of the present invention is to provide a grass clipping vacuum cleaner which will run only when the lawn mower blades are in operation.

It is a further objective of the present invention to provide a grass clipping collector which may be easily attached to and removed from a tractor.

Another objective of the present invention is to provide a grass clipping collector attachment for a tractor type lawn mower which requires no auxiliary power source or support wheels.

A still further objective of the present invention is to provide a grass clipping collector for a tractor type lawn mower which may be economically produced and has a minimum number of working parts to increase product reliability.

The foregoing and other objectives of the invention will become apparent in light of the drawings, specification and claims contained herein.

SUMMARY OF THE INVENTION

Presented hereby is a grass clipping collector system adapted to be attached to a tractor type lawn mower.

The system is comprised of a rigid blower housing including means to mechanically affix it to the rear of a tractor. The housing also includes mounting means adapted to support a plurality of pulleys which complete a drive train for a belt drive from the lawn mower blade shaft to the impeller of the vacuum fan contained within the housing. A rigid refuse container is permanently secured to the housing so that it will be supported by the tractor via the blower housing. The refuse container incorporates vent means which permit air to escape but retain grass clippings within the container.

The container also includes an access door which will permit cleaning of the container after use.

A vacuum conveyor system is provided between the vacuum blower and the lawn mower blade housing. This conveyor is in the form of a duct incorporating a flexible segment to allow for the floating action of the lawn mower blade housing.

DESCRIPTION OF THE DRAWINGS

FIG. 4 is a partial cutaway view of the grass clipping collector illustrating its coupling to the lawn mower drive shaft.

FIG. 5 is a detailed view of the pulley drive train incorporated in the side of the vacuum blower duct.

FIG. 6 is an enlarged cutaway view of the adapter affixed to the end of the lawn mower blade housing.

DESCRIPTION OF THE INVENTION

Figure 1:
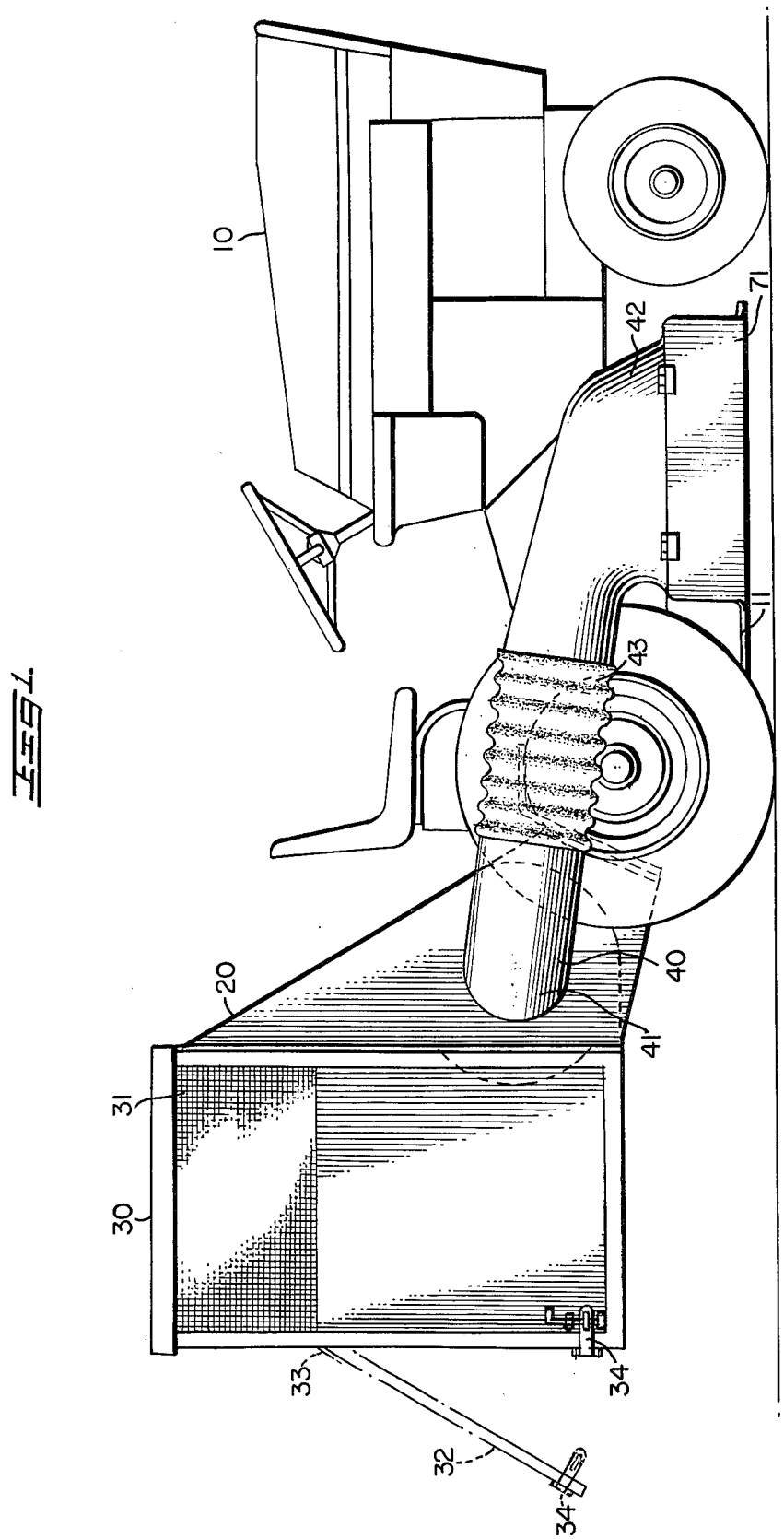
FIG. 1 is a side view of the grass clipping collector and vacuum attachment of the present invention installed on a tractor type lawn mower.

Referring to the drawings, FIG. 1 presents a side view of the grass clipping collector affixed to a tractor 10. The assembly consists of a blower duct housing 20 which functions as a mounting bracket adapted to support the refuse storage bin 30 and the duct conveyor 40. The duct conveyor includes a rigid duct 41 affixed over an opening in the blower duct housing 20, an adapter 42 connected to the lawn mower blade housing 11 and a flexible duct coupling the adapter 42 to the rigid duct 41.

The refuse storage bin 30 incorporates a screened portion 31 in the upper sector of at least one side and preferably on two sides. This screen provides a means for exhaust air to leave the refuse storage bin without a buildup of undue pressure which would hamper the operation of the system. The refuse storage bin also includes an access door 32 which is located at the back of bin and supported by hinges 33 which permit the door to be opened for easy access to the interior of the bin. A latch 34 is provided to prevent accidental opening of the refuse storage bin during use.

Figure 2:
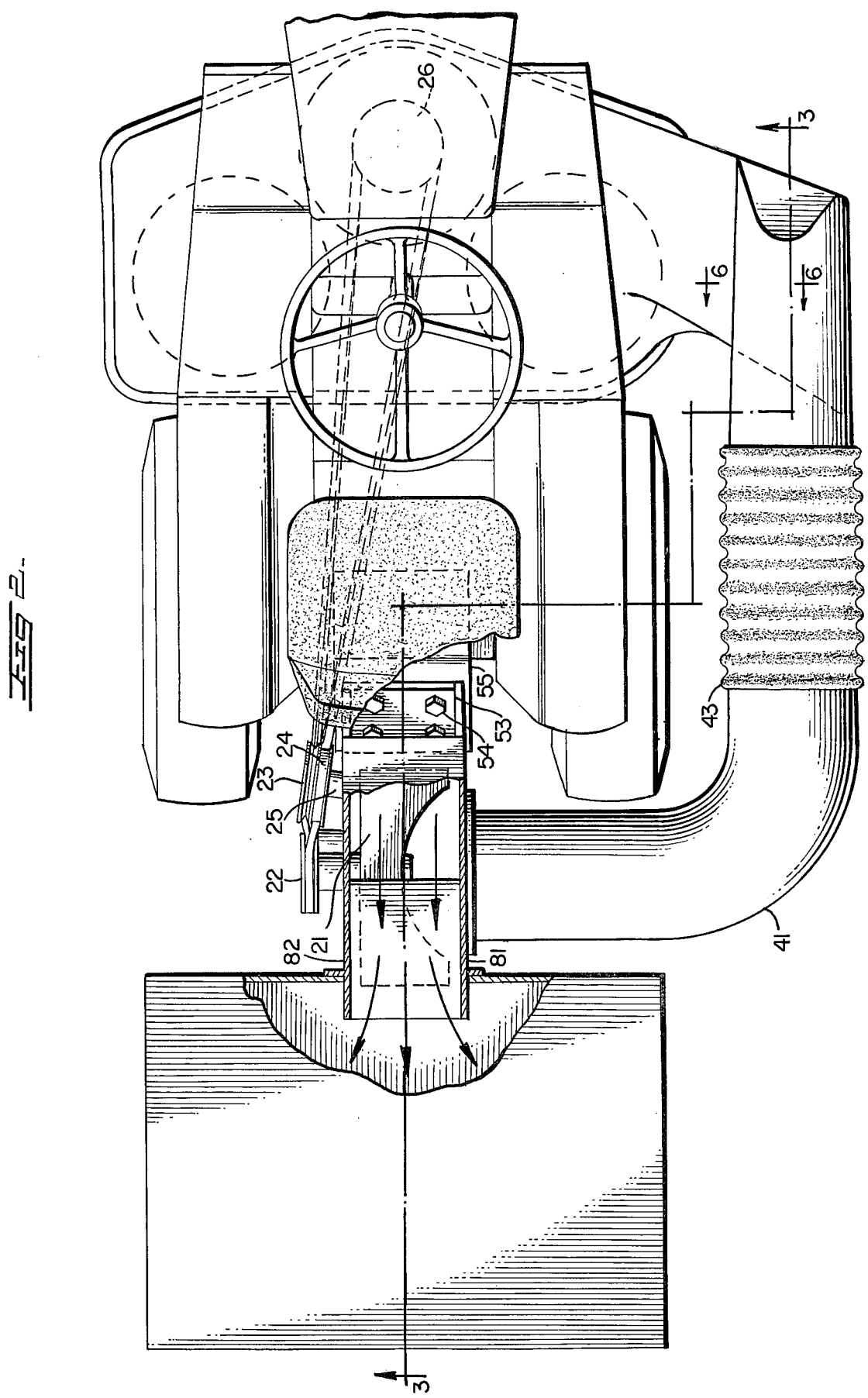
FIG. 2 is a top view of the tractor and grass clipping collector with portions broken away and shown in section.

FIG. 2 is a top view of the grass clipping collector attached to a tractor. This view is partially cutaway to illustrate the location of the blower impeller blades 21 and driving pulley 22. This illustration also portrays the idler pulleys 23 and 24 which in a preferred embodiment are supported by a slightly canted common support shaft 25 to provide the necessary straight belt runs between impeller drive pulley 22 and mower takeoff pulley 26. This drive train may be better visualized by viewing FIG. 4 in combination with FIG. 2 where it can be seen that drive belt 27 circles power takeoff pulley 26, is routed over idler pulleys 23 and 24 after being partially twisted, and then circles impeller drive pulley 22. A tensioning idler pulley 28 is slidably mounted on a brace 29 affixed to the blower duct housing 20, see FIG. 5. This pulley is provided to ensure that adequate tension is applied to the belt to prevent belt slippage. This pulley also provides a means to relieve tension on the belt for belt replacement purposes or to disable the collector while the mower is operating.

The tensioning pulley 28 includes a shaft 51 which may be provided with a threaded end adapted to cooperate with a nut so that it may be securely affixed to brace 29. In an alternate embodiment shaft 51 may be slidably secured in a slot in brace 29 and urged upward to tension the belt via a spring 52 incorporated in the slot of brace 29.

Figure 3:
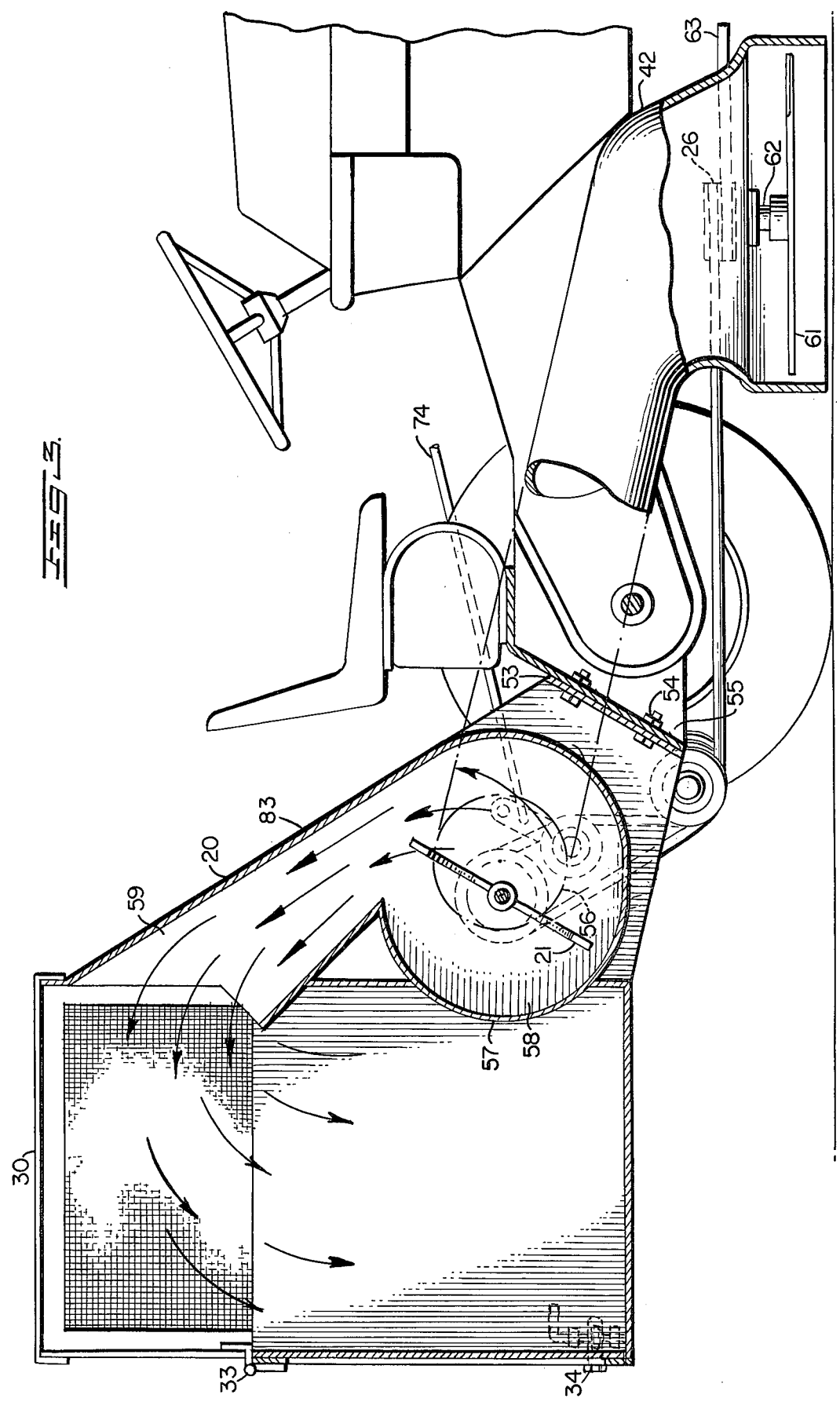
FIG. 3 is a cutaway view along the line 3—3 of FIG. 2 illustrating the vacuum blower and its association with the conveyor duct and refuse container.

FIGS. 2 and 3 illustrate blower housing coupling flange 53 which includes four nuts and bolts 54 adapted to secure the housing to a flange 55 on the back of the tractor.

The cutaway view of FIG. 3 illustrates the opening 56 in the blower duct housing 20 to which rigid duct 41 is connected.

When the system is in operation, clippings produced by lawn mower blades 61 of FIG. 3 are drawn into adapter 42 and through the duct work into the blower duct housing by the blower impeller blades 21. A channel is provided within the blower duct housing by a curved bottom wall 57 adapted to form an impeller cavity 58 and exhaust duct 59 in combination with side walls 81 and 82 and top wall 83 which channels refuse into the refuse storage bin 30.

FIGS. 3 and 4 depict the power takeoff adaption for the system which is simply a main drive pulley 26 secured to the top portion of the lawn mower blade drive shaft 62 so that as the lawn mower blades are being driven by belt 63 power will be provided via belt 27 to impeller 21.

FIG. 6 is a cutaway view of the adapter 42 which couples the conveyor duct 41, 43 to the lawn mower blade housing. This adapter incorporates a hinged door 71 which is held closed by a latch or in a preferred embodiment by spring biased hinges 72. This access door is provided to enable the lawn mower to function by discharging grass clippings straight out rather than causing them to be conveyed to the refuse storage bin. When this mode of operation of the lawn mower is desired, a control means such as control rod 74 must be activated to relieve the tension applied via pulley 28 to the vacuum blower impeller via belt 27.

Another primary function of the door 71 in the adapter is to provide access means whereby the duct may be unclogged in the event of excessive clippings plugging up the duct.

Although the preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim as a new and useful contribution to the art and for which I desire letters patent is:

1. An vacuum loading organic refuse collector attachment for a tractor lawn mower of the type incorporated a driven, shaft supported rotary blade contained within a housing and a rear hitch mounting plate, comprising:
   a refuse collection bin;
   a mounting bracket affixed to said refuse collection bin and adapted to be rigidly secured to said tractor, said mounting bracket adapted to support said refuse collection bin suspended above ground level;
   a blower housing incorporated in said mounting bracket;
   an impeller contained within said blower housing; a power transmission adapted to couple rotary energy from said driven rotary lawn mower blade shaft to said impeller; and
   a duct coupling said lawn mower blade housing to said refuse collection bin via said blower housing.

2. An apparatus as defined in claim 1, wherein said blower housing includes a discharge chute adapted to direct refuse into said refuse collection bin.

3. An apparatus as defined in claim 2, wherein said blower housing and said impeller are adapted to create negative pressure in said duct and positive pressure in said discharge chute.

4. An apparatus as defined in claim 3, wherein said power transmission comprises:
   a drive pulley affixed to said lawn mower blade driven shaft;
   a blower pulley;
   an impeller shaft supported by said blower housing and adapted to support said impeller and said blower pulley; and
   an endless loop drive belt coupling said drive pulley to said blower pulley.

5. An apparatus as defined in claim 4, wherein the axis of said impeller shaft is essentially perpendicular to the axis of said lawn mower blade drive shaft, further comprising:
   a first idler pulley adapted to change the course of said endless loop drive belt; and
   a second idler pulley adapted to change the course of said endless loop drive belt, said first and second idler pulleys sharing a common axis and supported by said mounting bracket.

6. An apparatus as defined in claim 5 comprising a tension pulley supported by said mounting bracket adapted to provide a bias force to said endless loop drive belt whereby said endless loop drive belt is in positive frictional engagement with said drive pulley and said blower pulley.

7. An apparatus as defined in claim 6, further including: an idler shaft affixed to said mounting bracket and adapted to support said first and second idler pulleys, said idler shaft axis oriented perpendicular to the axis of said drive pulley and at an angle greater than zero degrees but less than 90 degrees to the axis of said impeller shaft.

8. An apparatus as defined in claim 7, wherein said refuse collection bin is essentially a rectangular box structure including:
   a door; and
   a screened vent section.

9. An apparatus as defined in claim 7, wherein said mounting bracket is a channel structure comprising:
   a first side wall;
   a second side wall;
   a top wall;
   a bottom wall;
   a coupling flange incorporating bores therethrough adapted to mate with bores in said tractor mounting plate; and
   an open end wall adapted to mate with said refuse collection bin and form a chute opening through which said impeller exhaust enters said bin.

10. An apparatus as defined in claim 9, wherein said mounting bracket first and second side walls are adapted to form side walls of said blower housing.

11. An apparatus as defined in claim 10 including spring means to bias said tension pulley.

12. An apparatus as defined in claim 10 including means to disengage said tension pulley.

* * * * *